US008692885B2

(12) United States Patent
Sartor et al.

(10) Patent No.: US 8,692,885 B2
(45) Date of Patent: Apr. 8, 2014

(54) METHOD AND APPARATUS FOR CAPTURE AND DISTRIBUTION OF BROADBAND DATA

(75) Inventors: Mark Alan Sartor, Princeton Junction, NJ (US); Philip Wayne Miller, Yardley, PA (US); Arthur Robert Pope, Vienna, VA (US); Peter L. Demers, Hopewell, NJ (US); Nikhil Gagvani, Sterling, VA (US); Vincent Paragano, Yardley, PA (US); Daniel Clement Williams, Elkins Park, PA (US)

(73) Assignee: SRI International, Menlo Park, CA (US)

( * ) Notice: Subject to any disclaimer, the term of this patent is extended or adjusted under 35 U.S.C. 154(b) by 1378 days.

(21) Appl. No.: 11/662,841

(22) PCT Filed: Feb. 21, 2006

(86) PCT No.: PCT/US2006/006062
§ 371 (c)(1),
(2), (4) Date: Jul. 25, 2008

(87) PCT Pub. No.: WO2006/089279
PCT Pub. Date: Aug. 24, 2006

(65) Prior Publication Data
US 2009/0012995 A1 Jan. 8, 2009

Related U.S. Application Data (60) Provisional application No. 60/654,700, filed on Feb. 18, 2005, provisional application No. 60/665,461, filed on Mar. 25, 2005.

(51) Int. Cl.
*H04N 7/18* (2006.01)

(52) U.S. Cl.
USPC .......................................... 348/144; 348/143

(58) Field of Classification Search
USPC ................................................... 348/143, 144
See application file for complete search history.

(56) References Cited

U.S. PATENT DOCUMENTS 6,597,818 B2 * 7/2003 Kumar et al. ................. 382/294
2003/0215110 A1 11/2003 Rhoads et al.

OTHER PUBLICATIONS

Kumar et al., Aerial Video Surveillance and Exploitation, Proc. IEEE 89:10, 1518-39 (2001).

* cited by examiner

*Primary Examiner* — David X Yi
(74) *Attorney, Agent, or Firm* — Moser Taboada (57) ABSTRACT

A system and method for preparing for distribution to, distributing to and/or use by one or more devices broadband data associated with intelligence information garnered from an aerial vehicle ("AV"): The method may include obtaining from sensors coupled to the AV video depicting an area of surveillance, obtaining metadata associated with the video, aligning, temporally, the video and metadata, using reference information to align, spatially, the video and metadata, forming for distribution to the at least one device enhanced metadata as a function of the video, metadata and reference information, wherein the enhanced metadata is operable to enable displaying at the devices at least a portion of the video, whereby after receiving a distribution of the enhanced metadata, the devices are operable to display such portion of the video.

17 Claims, 5 Drawing Sheets

METHOD AND APPARATUS FOR CAPTURE AND DISTRIBUTION OF BROADBAND DATA

CROSS-REFERENCE TO RELATED APPLICATIONS

This application is a U.S. National Stage Application of PCT International Application No. PCT/US2006/006062, filed on Feb. 21, 2006, which in turn claims benefit of U.S. Provisional Patent Application Ser. Nos. 60/654,700, filed Feb. 18, 2005, and 60/665,461, filed Mar. 25, 2005. The entire disclosures of PCT International Application No. PCT/US2006/006062 and U.S. Provisional Patent Application Ser. Nos. 60/654,700 and 60/665,461 are incorporated herein by reference.

BACKGROUND OF THE INVENTION

1. Field of the Invention

The present invention generally relates to data distribution systems, and more particularly, to a method and apparatus for performing capture and utilization of georegistered data.

2. Description of the Related Art

Modern battlefield surveillance is performed using a manned or an unmanned aerial vehicle (collectively "AV") reconnaissance system in which the AV platform flies above an area to be surveilled ("surveillance area") and provides intelligence information about the surveillance area gathered from one or more sensors aboard the AV (e.g., video cameras, infrared cameras, radar, and other sensors).

The intelligence information is relayed by a radio link to a control center (also referred to as a ground station). The control center provides to the AV via the radio link command and control data to remotely pilot the AV above the surveillance area. Video information captured by the sensors aboard the AV and relayed to the control center as part of the intelligence information may be used to assist in remotely piloting the AV in addition to providing intelligence information regarding the surveillance area. However, identifying features and other intelligence information from within the video supplied by the AV is very difficult without any reference information about the surveillance area.

Furthermore, distribution of the intelligence information, especially video, is extremely limited because of the file size and transmission bandwidth needed to transmit such intelligence information. Even transmitting compressed video, such as MPEG-X (where X is 1, 2, or 4), requires substantial transmission bandwidth. Once annotation and other information are added to the video, the files sizes become very large. Thus, the video transmitted from the AV is generally maintained at the control center or other locations were substantial computer processing and transmission bandwidth is readily available. Although imagery is needed at location remote from the control center, e.g., on the battlefield, such imagery is hardly ever delivered to locations remote from the control center. As such, control center technicians may describe what they see in the imagery or send targeting coordinates to remotely located users, but the actual imagery is not sent to those remotely-located users that would find such imagery of most use.

Therefore, there is a need in the art for supplying a capture and distribution system for broadband data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements, wherein.

DETAILED DESCRIPTION

In the following description, numerous specific details, including details about different fields of use for such method and system, computing platforms, communication systems and protocols thereof, are set forth to provide a thorough understanding of the examples described herein. However, it will be understood that these examples may be practiced without these specific details.

In other instances, well-known methods, procedures, components and techniques are not set forth in particular detail, so as not to obscure the following description. Further, the examples disclosed herein are for illustration purposes only and other examples may be employed in lieu of or in combination with of the examples disclosed.

The examples disclosed herein are generally directed to a method and apparatus for capturing and distributing broadband data, such as video and other sensor data. In the method and/or the apparatus, one or more sensors disposed aboard at least one manned or unmanned aerial vehicle (collectively "AV") capture sensor data (i) depicting of an area of surveillance ("surveillance area"), and (ii) associated with the sensors.

This sensor data depicting of the surveillance area may be in the form of one or more video frames (collectively referred to herein as "video"), which is generally time-tagged so as to generate time-tagged video frames. The sensor data associated with the sensors may be metadata that describes parameters associated with the sensors (hereinafter "sensor metadata"). These parameters may include locations, orientations, zoom levels, etc. of the sensors with respect to their location aboard the at least one AV, and/or to a direction of flight of the at least one AV.

The time-tagged sensor data and the sensor metadata are relayed from the AV through one or more radio links to a control center for processing. Alternatively, the time-tagged video frames and sensor metadata may be passed from the control center to a master-control center via a satellite link. The master-control center, in addition to or in lieu of the control center may process the time-tagged video frames and sensor metadata or further process other forms of the time-tagged video frames and sensor metadata processed by the control center.

To facilitate processing, the control center and/or the master-control center may operate as servers. Each of the servers is operable to process the time-tagged video frames and the sensor metadata to form georeferenced data (also referred to as as georegistered data). Each or all of the servers may form the georeferenced data by combining the time-tagged video frames and the sensor metadata with geographic information ("geo-information").

The geo-information typically includes a calibrated reference data set of geographic information of the surveillance area. This calibrated reference data set may include, for example, aerial or satellite images of the surveillance area.

When forming the georeferenced data, the geo-information may be overlaid or "draped" by the time-tagged video frames in accordance with the sensor metadata so as to assist in aligning the time-tagged video frames with the geo-information. Additionally, one or more portions of the time-tagged video frames (e.g., one or more of the video frames) may be aligned with other portions of the time-tagged video frames (e.g., one or more of the other video frames) and/or the geo-information. The combination results in (i) enhanced metadata that defines an alignment of the time-tagged video frames and the geo-information, and (ii) imagery (e.g., video, georegistered video, video mosaics (real time or otherwise), and the like) that may be selected, in one or more various combinations, for display on one or user devices at the control center or elsewhere.

As an option, the time-tagged video frames may be also processed and overlaid with graphical data that denotes orientation or activity, which may include, for example, north arrow and other compassing features, geographical coordinate (e.g., longitude, latitude, and altitude indications moving target indication, tracks, local culture features, and the like. One or more results from such processing may be included (in one form or another) in the enhanced metadata.

To facilitate the distribution of the sensor data, one or more enhanced-metadata files containing the enhanced metadata are generated, which together or individually define (i) the alignment of the time-tagged video frames with the geo-information, (ii) translations for creating mosaics (real time or otherwise), (iii) annotation for the video frames, (iv) parameters for stabilization (full-resolution or otherwise), and (v) the like. The enhanced-metadata files may be in text, binary or other format, and may include eXtensible-markup language ("XML"), plaintext and other forms of hierarchical and flat representations. In addition, multiple configurations of the enhanced metadata files may be generated, each of which is configured to conform to different capabilities of the user devices, including, for example, capabilities associated with display formats.

Depending on the capabilities of each of the user devices, such user device may be sent and receive one or more of the multiple configurations of the enhanced-metadata files. For example, one or more of the user devices may be or be deployed with a media player having low-overhead and processing requirements (referred to herein as a "simple-type" media player). This simple media player may be operable to play streamed video in accordance with one or more of the multiple configurations of the enhanced metadata files that do not require substantial computing power. As such, the simple media player may use such enhanced metadata files to assemble various display formats for the video frames without requiring substantial computing power (i) for executing the simple media player and/or (ii) in the user device itself.

As an alternative, "raw" (e.g., non-post processed) or partially-processed (e.g., stabilized) video may be sent directly from the AV to one or more of the user devices and the control center. The AV may also send to the control center the sensor metadata. The control center may process the raw or partially-processed video and sensor metadata as above to create the enhanced metadata files. Since the user devices have the raw or partially-processed video, the control center may then transmit to such user devices one or more appropriate configurations of the enhanced metadata files, without transmitting the raw or partially-processed video. Each of the user devices may use the time tags of the time-tagged video frames in conjunction with the enhanced metadata garnered from the enhanced metadata files to create the georegistered data.

Figure 1:
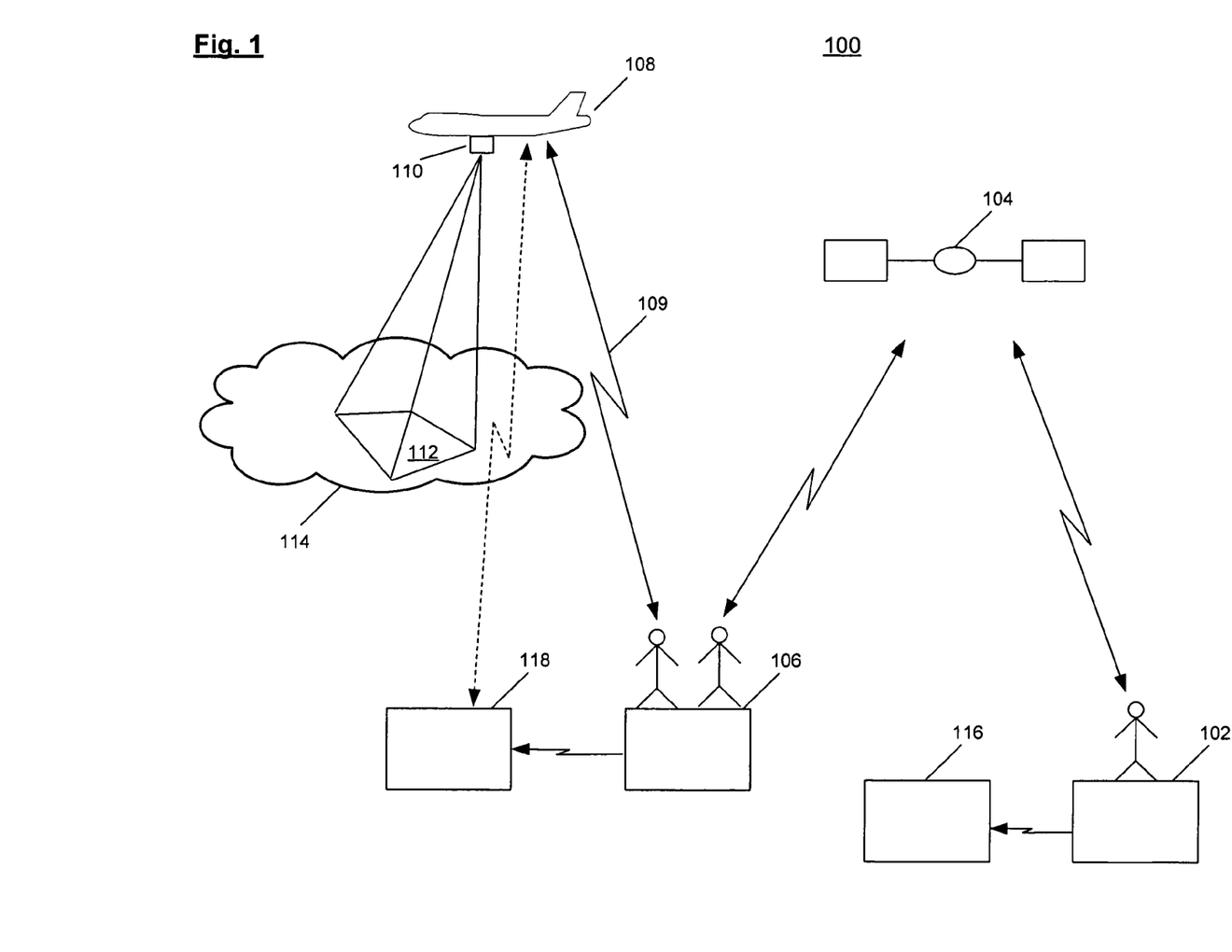
FIG. 1 is a block diagram illustrating an example of a system for capturing and distributing broadband data.

If, for example, one or more of the user devices are deployed with simple media players, the control center may send to such user devices one or more configurations of the enhanced-metadata files that allow for displaying the imagery without requiring substantial computing power (i) for executing the simple media players and/or (ii) in the user devices. Consequently, one or more of the user devices deployed with relatively simple processing capabilities and a simple media player, can display to combatants on the battlefield sophisticated imagery garnered directly from the AV 108.

As an option, the user devices may also process and overlay the time-tagged video frames with graphical data that denotes orientation or activity, which may include, for example, north arrow, moving target indication, tracks, local culture features, and the like. One or more results from such processing may be included (in one form or another) in the enhanced metadata.

Referring now to FIG. 1, a block diagram illustrating an example of a system for capturing and distributing broadband data, such as the sensor data, is shown. The system 100 includes a master-control center 102, a communications satellite 104, a control center 106, a AV 108 and user devices 116, 118. For simplicity, only one AV, namely AV 108, is shown. The system 100, however, may include more than one AV.

The AV 108 is controlled by the control center 106 using command and control information that it sends to the AV 108 via a radio link. This command and control information may also control one or more sensors, such as infrared cameras, radar imaging equipment, Global Positioning System ("GPS") receivers, inertial navigation units and the like, disposed aboard the AV 108. For instance, the command and control information may be used to control a field of view ("FOV") 112 of a camera 110 aboard the AV 108. To do this, the control center 106 may supply the command and control information for controlling an orientation of a gimbal supporting the camera 110.

In addition, the control center 106 may supply command and control information so as to control the AV 108, and more particularly, the camera 110 and the other sensors (not shown) to create intelligence information (i) depicting of surveillance area 114, and (ii) associated with the sensors. This intelligence information may include the time-tagged video frames and the sensor metadata.

The AV 108 may format the time-tagged video frames in accordance with any of the MPEG-X (where X is 1, 2, or 4) standards. The AV 108 may also format the metadata into a thin file for download.

The AV 108 may transmit the intelligence information, including the time-tagged video frames and sensor metadata, to the control center 106 via a radio link 109. The intelligence information may be processed at the control center 106, and/or passed to the master-control center 102 via a satellite link formed by at least one communication satellite 104. As such, the control center 106 may operate as a conduit for the intelligence information as well as for command and control instructions that are exchanged with (i.e., sent to and/or received from) the master-control center 102.

The control center 106 and the master-control center 102 may operate as servers for processing the intelligence information into video imagery and serving such imagery to the user devices 116, 118. One or both of the control centers 106, 108 may be used to create and store the enhanced metadata in the multiple configurations of the enhanced metadata files.

As noted above, the enhanced metadata filed may be in text or binary format, and may include XML, plaintext and other forms of hierarchical and flat representations. The enhanced metadata stored in the enhanced metadata files may define parameters, rules, commands, arguments, operands, operators, dimensional values, configurations, and other data (collectively "parameters") that are used to control the operation of and/or facilitate processing of the video imagery; including parameters for mosaic generation (real time or otherwise), geo-registration, video stabilization (full-resolution or otherwise), and the like.

The enhanced metadata may also include, for each of the user devices separately or collectively, parameters for transforming, stabilizing and/or otherwise adapting the user devices 116, 118 for displaying the video imagery. As noted above, which of these parameters that the servers server depend on the capabilities of the user devices 116, 118.

The user devices 116, 118 are operable to receive some or all of the video imagery distributed from the control center 106 or the master-control center 102. From which of the control centers 102, 106 may depend upon where the user devices 116, 118 are situated, and the form and/or quantity of the imagery exchanged may depend on requirements, and/or the capabilities of the user devices 116, 118.

As an alternative, one or more of the user devices 116, 118 may receive (i) the time-stamped video frames (or other sensor data depicting the surveillance area 114) directly from the AV 108, and (ii) the enhanced-metadata files from the control center 106 and/or the master-control center 102. In this manner, the user devices 116, 118 may not need to obtain the time-tagged video (or other sensor data depicting the surveillance area 114) from the control center 106 or the master-control center 102.

Each of the user devices 116, 118 may use the time-tagged video and the enhance metadata garnered from the enhanced-metadata files to create various displays for displaying the imagery to users of user devices 116, 118. These displays may include stabilized video, mosaic images, geo-registered images, and the like.

Each of the user devices 116, 118 may be deployed with a simple media player and relatively little processing power. As such, the user devices 116, 118 may obtain from the control center 106 and/or the master-control center 102 the enhanced-metadata files that are compatible with such simple media player and processing power requirements.

Although only one control station and one master control station are shown for simplicity, the system 100 may and is likely to include more than one control station and more than one master-control station. In addition only two user devices, namely user devices 116, 118, are shown for the same reason. The system 100, however, may include more or fewer user devices.

Figure 2:
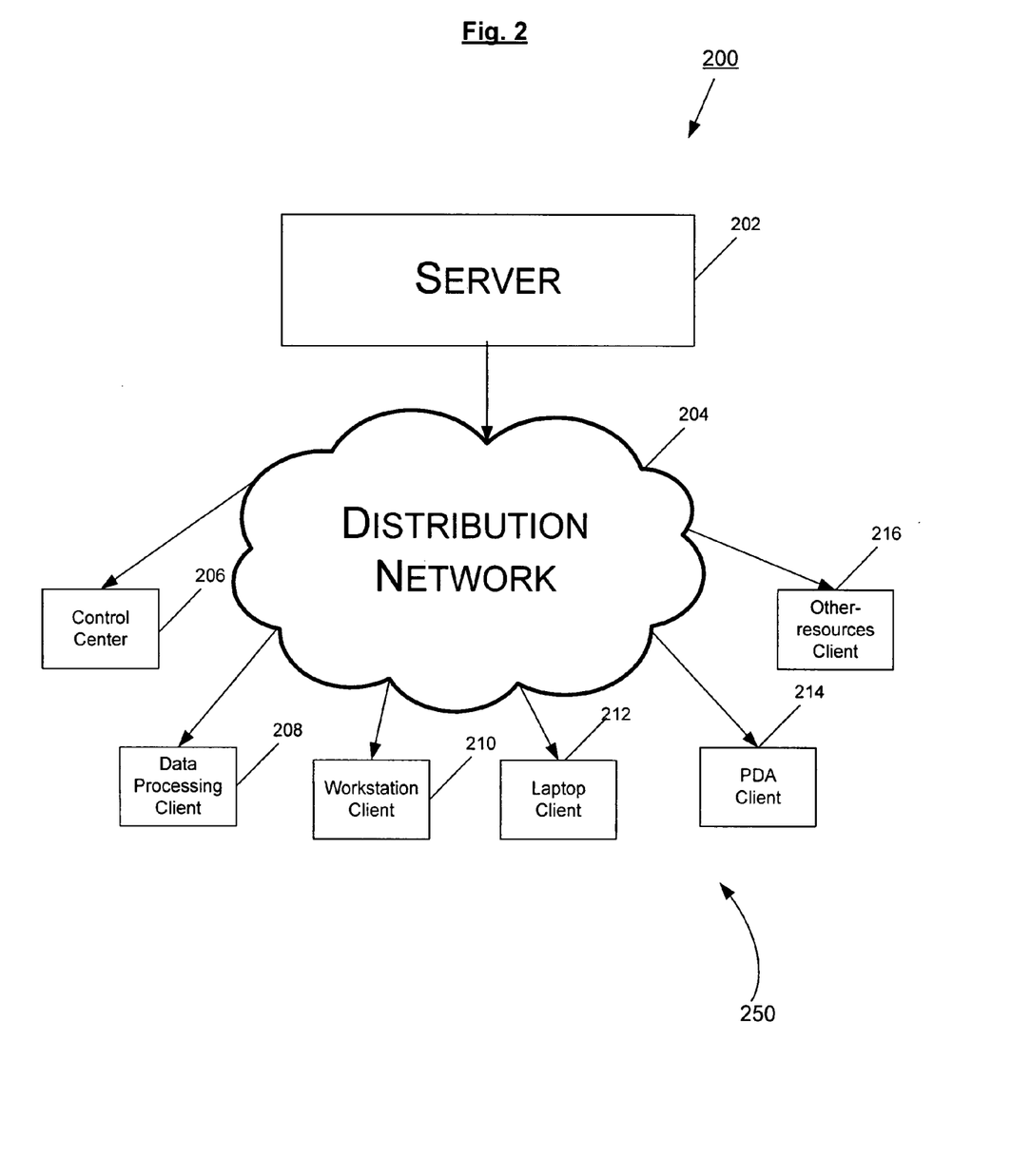
FIG. 2 is a block diagram of illustrating an example of a distribution system for distributing broadband data.

FIG. 2 is a block diagram illustrating an example of a system 200 for analyzing time-tagged video and sensor metadata so as to produce broadband data (e.g., video and/or enhanced-metadata files) that can be distributed to various clients. The system 200 of FIG. 2 is similar to the system 100 of FIG. 1, except as described hereinbelow.

The system includes a server 202, which may be included in the master control station 102 (FIG. 1); a distribution network 204; a control center 206, which may be similar to the control center 106 (FIG. 1); and a plurality of client user devices (referred to as "clients" for simplicity). The clients may include a data-processing client 208, a workstation client 210, a laptop client 212, a personal-digital assistance client 214, and an other-resources client 216. The clients are collectively referred to herein as, clients 250.

The server 202 performs analysis and processing of the video and sensor metadata to produce the broadband data for distribution to the clients 250 via the distribution network 204. The server 202 may also provide support for simultaneous recording and playback of the time-tagged video, sensor metadata, broadband data, etc. Additionally, the server 202 may provide fully functional synchronous playback; play, play-backward, play-fast-forward of the time-tagged video, sensor metadata, broadband data, etc., and provide for seamless switching between a live and archived playback mode.

The server 202 may contain a computer and operating system, or may be a hardware "card" specifically designed for efficiently processing the time-tagged video and sensor metadata into the broadband data. The specific nature of the hardware is not limited.

Additionally, the server 202 may include a visualization tool (as described in more detail below). This visualization tool may be executed on the server 200 to allow for display of the broadband data locally at the control center 206 and/or the clients 250.

The visualization tool may provide advanced situation awareness, support for a plurality of (e.g., 10) feeds of the sensor data, and overlaid rendering of the time-tagged video over terrain data supplied by one or more of the clients 205 and/or over other reference imagery. The visualization tool may also provide import capability for geo-referenced terrain data, allowing accurate target location acquisition based on input from one or more of the clients 250; measurement capability between points of interest selected from one or more of the clients 250; geo-location capability for objects or ground points; common operation picture display from tactical feeds using, for example, MIL Standard symbols; export capability of screen shots with overlaid video, target points and tactical symbols; and the like.

The distribution network 204 provides communication links over which the broadband data may be distributed to the clients 250. After receipt of the broadband data, one or more of the clients 250 may display imagery contained within the broadband data. To do this, one or more of the clients 250 may employ a playback tool, such as the simple media player, that plays or otherwise displays the imagery in accordance with the enhanced metadata, which may also be included within the broadband data. The playback tool may perform playing or otherwise displaying the imagery by reading from the broadband data the enhanced metadata and the time-tagged video.

The playback tool may play or otherwise display the imagery in real time, in near real time, or substantially continuous with receipt of the broadband data (assuming that the broadband data is distributed in real time, in near real time, or substantially continuous with receipt of the time-tagged video from the AV 108. Alternatively, the playback tool may play and/or replay or otherwise display and/or redisplay the imagery in at sometime after receiving the broadband data or after the AV 108 sent the time-tagged video.

Figure 3:
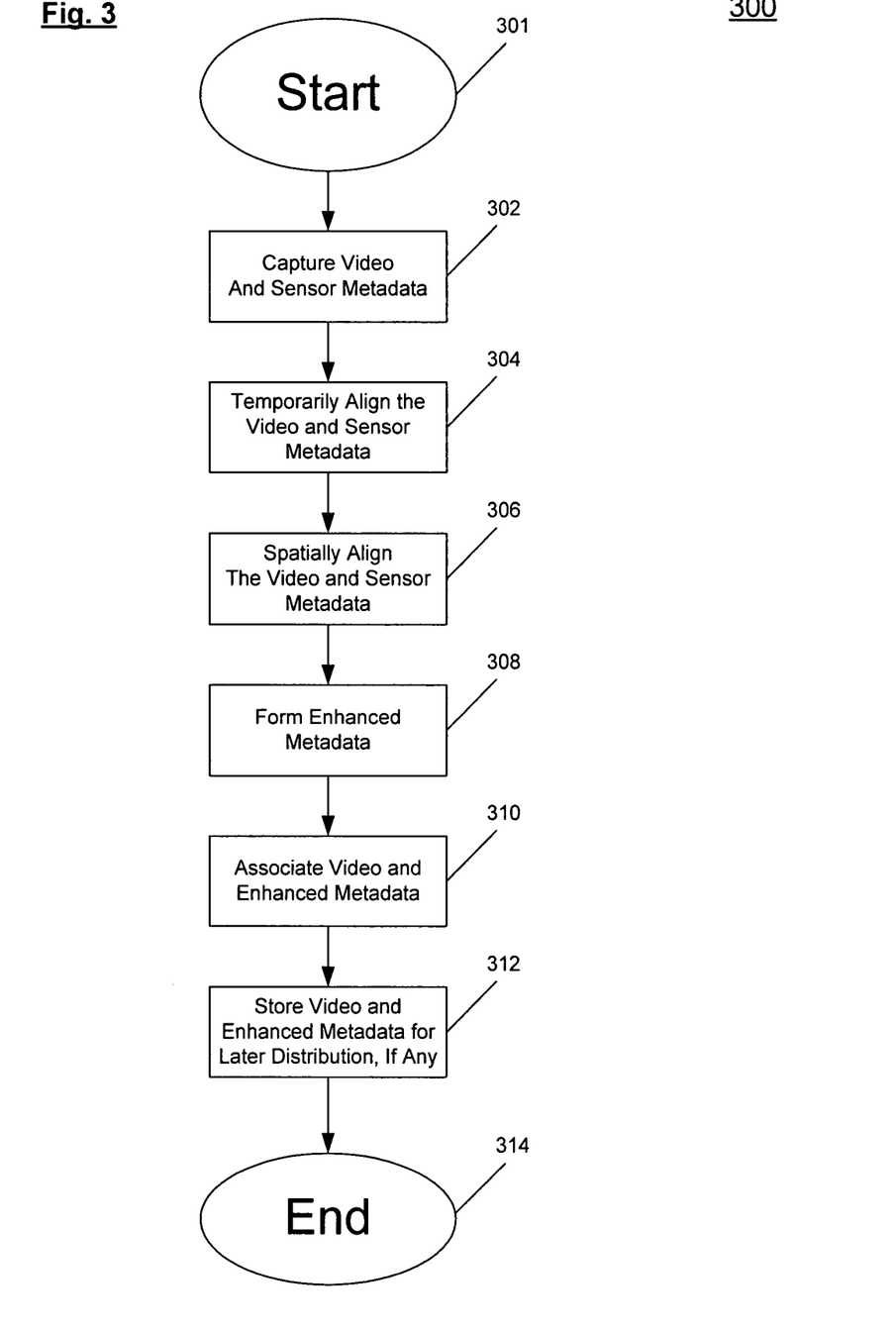
FIG. 3 is a first flow diagram illustrating an example of a process for producing georegistered data.

FIG. 3 is a flow diagram illustrating an example of a process 300 for processing captured time-stamped video and sensor metadata. Although the process 300 may be carried out in any architecture, the process 300 is described with reference to the architecture 100 (FIG. 1) and 200 (FIG. 2) for convenience.

The process 300 begins at termination block 301 and transitions to process block 302. At process block 302 the AV 108 captures a plurality of video frames and sensor metadata relating to the FOV 112 of surveillance area 114. As part of or ancillary to capturing the plurality of video frames, the AV 108 time tags the video frames to form the time-tagged video frames.

In some instances, the sensor metadata captured by the AV, which as noted above may include a plurality of instances of parameters (e.g., orientations) of the camera 110 and a platform of the AV 108, may be translated into a format that can be used by the process 300. After process block 302, the process 300 transitions to process block 304.

At process block 304, the time-tagged video frames and the sensor metadata may be aligned temporally. This may be performed by synchronizing and/or filtering sensor metadata with one or more time tags associated with the time-tagged video frames. As such, each of the plurality of instances of the parameters (e.g., orientations) of the camera 110 and the platform of the AV 108 may be associated with one or more of the time stamps. Thus, for each of the time-tagged video frames, the parameters of the camera 110 are known. After process block 304, the process 300 transitions to process block 306.

At process block 306, the time-tagged video frames and the sensor metadata may be aligned spatially. This may be performed by combining geo-information (i.e., a reference data set, such as satellite or aerial images) of the surveillance area 114, with the time-tagged video and/or sensor metadata using a georegistration and/or georeferencing processes. By way of example, the time-tagged video frames and the sensor metadata may be aligned spatially by overlaying (e.g., "draping") the time-tagged video upon the geo-information. Alternatively, the georegistration and/or georeferencing processes may be performed in accordance with *Aerial Video Surveillance and Exploitation*, Kumar et al., Proceedings of the IEEE, Vol. 89, No. 10, October 2001; or commonly-owned, U.S. Pat. Nos. 5,359,674, 5,561,617, 5,629,9886,044,166, 5,847,755, 5,963,675, 6,567,564, 6,647,150, 6,188,381; each of which is incorporated herein by reference in its entirety.

Outputs of the georegistration and/or georeferencing processes are raw video (V) and enhanced metadata (eM) corresponding to the time-tagged video and the geo-information. This enhanced metadata, as above, may include (i) parameters for video stabilization, parameters for georegistration (e.g., information regarding the transformation and alignment of the time-tagged video with the geo-information), (iii) information associated with frame-to-frame motion ("frame-to-frame motion information"), and (iv) the like.

Optionally, the process blocks 304 and 306 may be performed together since the functions thereof have similar objectives. That is, the process blocks 304 and 306 both have objectives for improving and/or enhancing the sensor metadata. These objectives may be realized, for example, by applying the filter to the sensor metadata to (i) reduce noise in the measurements, and (ii) incorporate the geo-information and the frame-to-frame motion information (as measured by an image stabilization process). The combined process may generate the enhanced metadata so as to include parameters for better telemetry for the camera 110 and better frame-to-frame image motion as compared to a non-combined process. After process block 306, the process 300 transitions to process block 308.

At process block 308, the process 300 may create one or more enhanced metadata files that, individually or in some combination, contain all or a subset of the enhanced metadata. One or more of these enhanced metadata files may be formatted using a thin-file format, such as an XML file or other file format for thin-file service.

Alternatively, the process 300 may create a number of versions of the enhanced metadata files, each of which may be include the enhanced metadata for complying with the requirements and/or capabilities of one or more of the user devices 116 118 and/or clients 250. For example, the user device 116 may not be capable of creating certain types of displays or display formats. Accordingly, the process 300 may not create for (or later send to) the user device 116 one or more of the enhanced metadata files that contain parameters for which the user device 116 finds useless. After process block 308, the process 300 transitions to process block 310.

At process block 310, the process 300 assembles and/or associates, for each of the user devices 116, 118 and/or each of the clients 250, the time-tagged video and one or more appropriate enhanced metadata files for distribution to the user devices 116, 118 and/or the clients 250 via the distribution network, the communication link 109, and/or the satellite link. At process block 312, the time-tagged video and each (if more than one) the enhanced metadata files so assembled or associated are stored in memory (or otherwise utilized). The time-tagged video and appropriate enhanced metadata files may be sent to the user devices 116, 118, and/or one or more of the clients 250.

At termination block 314, the process 300 terminates. Alternatively, the process 300 may return to termination block 301 to start again.

The visualization tool may be used to generate one or more displays of the time-tagged video, including displays for terrain overlays, mosaics, target tracking, feature identification, and so on. The visualization tool may generate the displays so as to be consistent with (i) the computing power of the user devices 116, 118 and/or clients 250 that execute the visualization tool, and (ii) the format and/or content of information available to the user devices 116, 118 and/or clients 250.

Depending upon their capabilities, one or more of the user devices 116, 118 and/or clients 250 may also perform target detection and/or target tracking. Such target detection and/or target tracking may be performed, for example, on objects moving across the FOV 112 and/or to the extent that the such objects continue to move and stay within the FOV 112.

Figure 5:
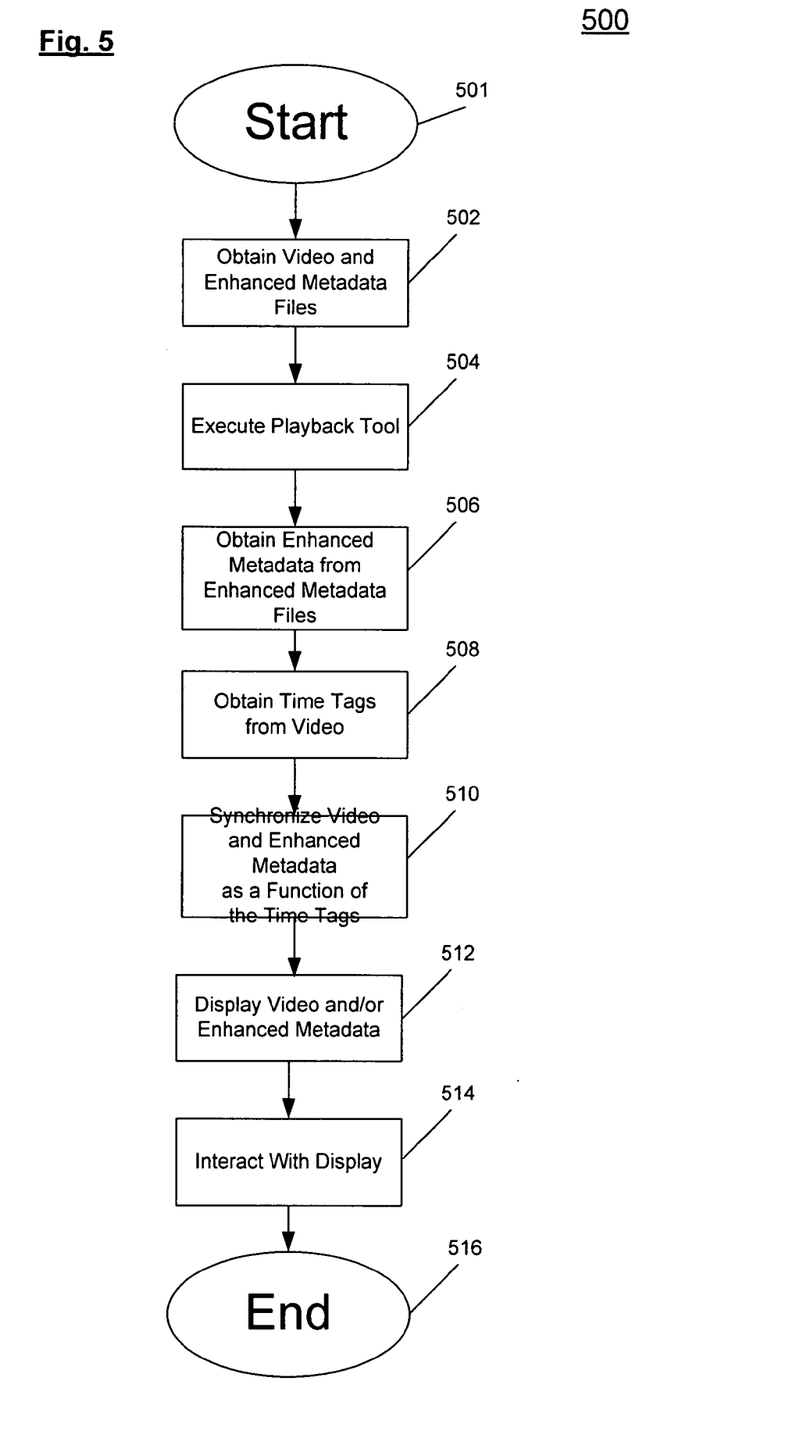
FIG. 5 is a second flow diagram illustrating a process for displaying georegistered data.

To facilitate the target detection and/or target tracking, the process 300 may output a data stream that (i) can be transmitted using a small amount of or low-rates of bandwidth, (ii) provides information about the time-tagged video originally captured by the AV 108 ("AV video"), and (ii) when combined with the AV video at one or more other locations, a thin client, for example, can be used to guide the target detection and/or target tracking using one or more presentation processes, an example of which is illustrated in FIG. 5. Incorporated in the data stream may be unique identifier for each of the objects, a correlation tracking function for tracking the objects, and the like. These items may be incorporated into the enhanced metadata, and in turn, one or more of the enhanced-metadata files.

These presentation processes may include, for example, performing video stabilization, creating a mosaics, forming a three-dimensional visualization (e.g., draping imagery over a terrain model), and/or providing annotation of target locations and scene locations (e.g., maps, compass symbols, etc).

Figure 4:
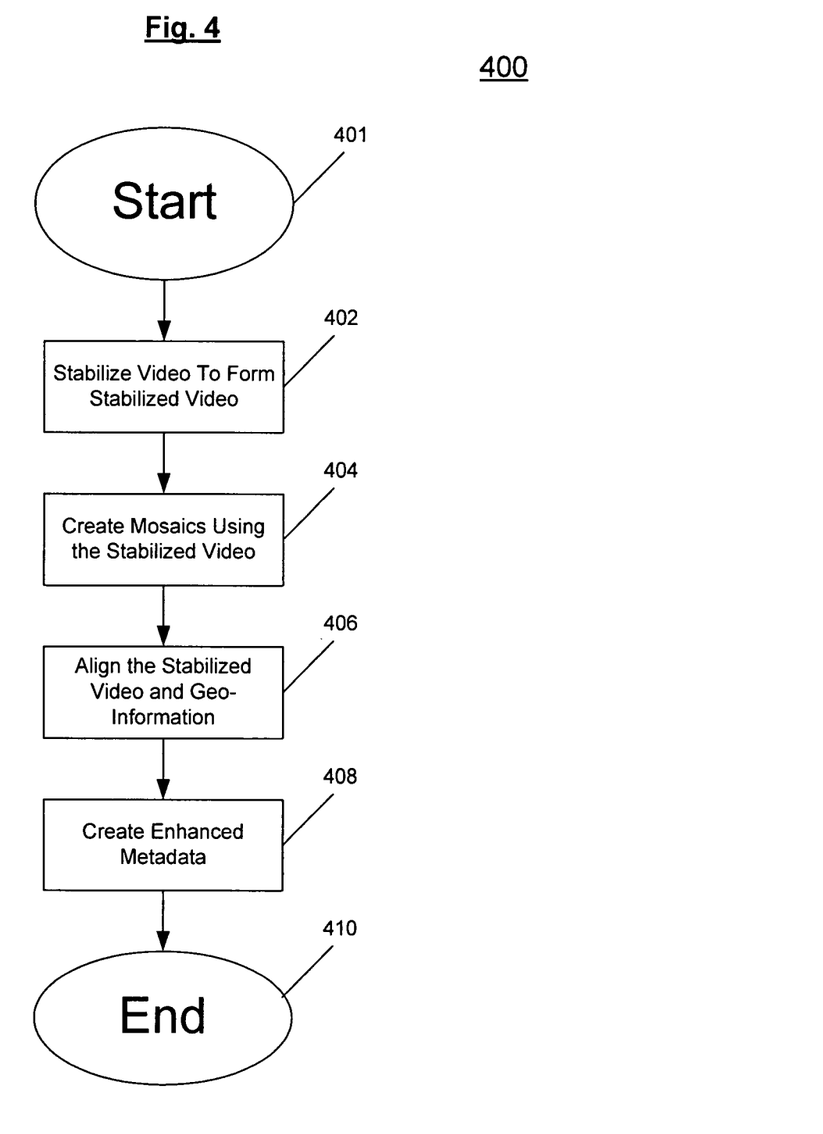
FIG. 4 is a second flow diagram illustrating an example of a process for georegistering video.

Referring now to FIG. 4, a flow diagram illustrating an example of a process 400 for producing georegistered data, such as set forth in process block 306 of FIG. 3, is shown. Although the process 400 may be performed using most any architecture, the process 400 is described herein with respect to the architecture 200 of FIG. 2.

The process 400 starts at termination block 401 after receiving at the server 202 from the AV 108 time-tagged video frames, and for each of the video frames, a corresponding set of sensor metadata. Sometime thereafter the process 400 transitions to process block 402.

At process block 402, the server 202 stabilizes the time-tagged video frames so as to form corresponding stabilized-video frames. Details of examples of processes and systems for stabilizing video may be found in commonly-owned, U.S. Pat. Nos. 6,512,857, 6,597,818, 6,587,601, each of which is incorporated herein by reference in its entirety.

At process block 404, the server 202 creates a mosaic for each of the stabilized video frames using its associated set of sensor metadata.

At process block 406, the server 202 uses geo-information, the stabilized video frames and the associated set of sensor metadata to align one or more images captured in the time-tagged video frames. As above, the geo-information may be include any of an aerial photograph taken from a reconnaissance aircraft; a satellite photograph, an infrared photograph; radar information and/or any other form of surveillance data that provides geographic information.

The server 202 may first align the geo-information and each of the video frames so as to produce corresponding aligned-video frames, and then secondly align each of the aligned-video frames with one another to produce the frame-to-frame motion information.

The server 202 may use user-assisted information fed back ("feedback") to it by the control center 206 and/or one or more of the clients 250 to assist in aligning each of the images captured in the time-tagged or later processed video frames. These clients 250 may provide the feedback to assist in geo-registering one or more of the time-tagged or later processed video frames.

For example, a user of, say, the control center 206, visually observes one or more the time-tagged or later processed video frames (e.g., one or more video frames previously unregistered or incorrectly registered) overlaid on a map image (i.e., geo-information). Responsive to a visual alignment of features common to the time-tagged or later processed video frames and the map image, the control center 206 provides the feedback to the sever 202, via a manual input of the user of the center client 206 (and via distribution network 204).

For each of the time-tagged or later processed video frames that the control center sends the feedback, the feedback may be in the form of (i) a dimension (or alternatively dimensions) of the video frame with respect to the map image, and/or (ii) a location (or alternatively, locations) on the map image where the video frame should be registered. Such dimensions and locations may be based on the observations of features common of the time-tagged or later processed video frames and the map image. The feedback may also include information for reducing or increasing a current resolution, quantity and/or quality of the time-tagged or later processed video frames so that the other clients 250, server 202, and/or control center 206 can display the time-tagged or later processed video frames and enhanced metadata in such increased or decreased resolution, quantity and/or quality.

The manual input may be performed using a selector device, such as a computer mouse, a pointer, a touch screen, or other similar I/O device. For instance, the user may depress (commonly referred to as "clicking") a button of the computer mouse at or near a portion or all of one of the time-tagged or later processed video frames (or image map), and while still depressing the button, the user moves the computer mouse to a position near or at another portion of the time-tagged or later processed video frame (or map image) so as to select all or a portion of the time-tagged or later processed video frame. Without de-selecting, the user drags the so selected time-tagged or later processed video frame (or map image) so as to place it at a location on the map image; resizing as needed.

The location and size of the so selected time-tagged or later processed video frame (or map image) may be one or more coordinates associated with the location and size. For example, the location and size may be defined by two coordinates on the map image. One of these coordinates may be associated with an upper left-hand of such video frame (or map image), and the other of the coordinates may be associated with a lower right-hand corner of the video frame (or map image). Clearly, this is just one example of the manual input, and others are possible as well.

At process block 408, the server 202 creates the enhanced metadata. This enhanced metadata includes parameters that are used to define alignment, rendering, frame-to-frame motion information, and the like of the aligned-video frames and the geo-information. At termination block 410, the process 400 terminates. Alternatively, the process 400 may return to termination block 401 to start again.

Additionally, the server 202 may be provided with an algorithm that significantly increases geospatial accuracy of alignment of the video frames and the geo-information. This algorithm may do so by way of a weighting function that shifts reliance of georegistration toward or away from reliance on the associated sets of sensor metadata. When the sensor metadata is significantly inaccurate, georegistration might become inaccurate. In addition, updates to the sensor metadata might lag behind updates to the time-tagged video frames, which may result in the sensor metadata being inaccurate for some of the time-tagged frames, but not others.

After georegistration of the video frames (i.e., the video frames are matched to reference data), such as in process block 406, the frame-to-frame motion information may be used to predict motion of the camera 110 more accurately and/or more quickly than using updates of the sensor metadata. As such, the frame-to-frame motion information, at certain times, more useful for georegistration than the sensor metadata; while at other times, the sensor metadata may be more useful for georegistration than the frame-to-frame motion information.

To facilitate determining when to use the sensor metadata or the frame-to-frame motion information, the server 202 may use an automatic or manual procedure to determine a degree of reliance on the sensor metadata and/or on the frame-to-frame motion information for aligning the time-tagged and/or stabilized video frames and the geo-information.

FIG. 5 is a flow diagram illustrating an example of a process 500 for displaying georegistered data at a user device, such as one of the clients 250. The process 500 may be performed using most any architecture in accordance with the client architecture described herein, for convenience however, the process 500 is described with respect to the architecture 200 of FIG. 2.

In addition, the user device may include, or be adapted to, combined with, embedded into, integrated with, integral to or otherwise coupled with a playback tool, such as simple or non-simple media player. The user device may possess (e.g., have stored therein) geo-information or, alternatively, download the geo-information from the server 202 or other source periodically or as needed. Depending on the location of the user device, the user device may possess, download and/or replace its possessed geo-information with different geo-information.

The process 500 starts at termination block 501 and transitions to process block 502. At process block 502, the user device receives (i) one or more enhanced-metadata files containing enhanced metadata and (ii) one or more time-stamped video frames garnered from the AV 108. The user device may receive the time-tagged video frames from the AV 108 directly or, alternatively, from the control center 206. As an alternative to time-tagged video frames garnered from the AV 108, the user device may receive one or more processed video frames, such as the stabilized and/or aligned video frames noted above.

At process block 504, the user device executes its playback tool so as to cause it to display an enhanced version of the time-tagged video frames garnered from the AV 108. At process 506, the playback tool obtains the enhanced metadata (e.g., extracts and/or reads the enhanced metadata) from one or more of the enhanced-metadata files.

At process block 508, the playback tool obtains (e.g., extracts or reads) the time tags associated with the time-tagged video frames. At process block 510, the playback took synchronizes the time-tagged video frames and the enhanced metadata such that the portion of the enhanced metadata that is applicable to each of the time-tagged video frames is be displayed together with or causes proper display of the time-tagged video frames. To facilitate such display, the enhanced metadata, in accord with above, includes information to align the video frames and geo-information to form the imagery, including the georegistered imagery, mosaics, video overlays, and the like.

At process block 512, a user of the user device may cause the user device to selectively display the video frames in various display formats, including for example, a stabilized video display format, an orthomosaic format, a two-dimensional or three-dimensional map viewer format, various overlays of video and/or mosaics over geo-information format, or other forms of display. At process block 514, the user may interact with the user device to identify one or more target locations; annotate imagery of the video frames with textual and or graphical information; rotate or otherwise change the display format; generate the feedback and/or perform other interactions with user device.

Any of the feedback from the user input into the user device may be transmitted or fed back to the control center 206 and/or the AV 108 for distribution to the one or more of the clients 250, control center 206, and/or the server 202. Each of the clients 250, the server 202, and the control center 206 may use the feedback for further enhancement, including the target detection and/or target tracking. Because all of the images are registered with the geo-information, the user may identify a location as noted above so that true coordinates of such location may be displayed, captured, or transmitted to one or more of the clients 250, server 202 and control center 206.

At process block 516, the process 500 terminates. Alternatively, the process block 500 may return to the termination block 501 to begin the process 500 again.

Some or all of the foregoing is useful for executing reconnaissance missions for military (e.g., Special Forces) operations, including managing of assets. For such scenarios, the AV 108 may collect from over enemy territory reconnaissance data (e.g., intelligence information) that includes the time-tagged video frames and sensor metadata. Although, the sensor metadata may include sensor metadata for each of the time-tagged video frames, at times the sensor metadata may not include sensor metadata for all of the time-tagged video frames After or simultaneous with collecting such reconnaissance data, the AV 108 may provide the time-tagged video frames and sensor metadata to the control center 206, the server 202 and/or other processing centers. The control center 206, the server 202, and/or other processing centers, in turn, may process the time-tagged video frames and sensor metadata as discussed above. The control center 206, the server 202, and/or other processing centers may also digitally record the time-tagged video frames and the sensor metadata in a compressed or an uncompressed format.

Various software tools, such as those listed above, may be used to analyze and correct the time-tagged video frames. The time-tagged video frames that have associated sensor metadata may be analyzed in real time, allowing for creation of the enhanced metadata, which as noted, not only provides for improved geospatial location of such time-tagged video frames, but also provides additional data such as the frame-to-frame motion information.

Importantly, the control center 206, the server 202, and other processing centers may distribute this enhanced metadata data to user devices of one or more remote and/or arbitrary networked users. Such user may include, for example, forward observers, who may be connected by and able to receive time-tagged video frames and the enhanced metadata from over wired or wireless link to the control center 206, the server 202, and/or other processing centers.

Alternatively, the user devices may have already obtained the time-tagged (and/or processed) video frames with or without the sensor metadata from the AV 108, the control center 206 or from another source. In this case, control center 206, the server 202, and/or other processing centers may provide to the user devices the enhanced metadata of a portion thereof that corresponds to the time-tagged video frames they currently posses.

Such enhanced metadata in the form of the enhanced-metadata files may be transmitted to the user devices over the distribution network 204, via a radio link and/or via a video link from the AV 108. Although such enhanced-metadata files may be time shifted from the time-tagged video frames, the playback tools of the user devices may beneficially synchronize the enhanced metadata with the time-tagged video frames in accordance to the time tags thereof.

Once invoked, the playback took may provide the time-tagged video frames in a geospatially accurate form, which can be displayed to the users of the user devices in a variety of forms, including those noted above, and other forms that provide tactical and/or situational awareness. From this enhanced metadata, the users may act upon the enhanced metadata as well as mark up or otherwise provide the feedback relevant to the their situations to the control center 206, the server 202, and/or other processing centers, and/or clients 250 that are connected to the system 200.

Variations of the system and method described above are possible without departing from the scope of the following claims. For example, each of the devices, severs and the like may include a schema for representing in a geographic information system ("GIS") database information about the time-tagged video, sensor metadata, enhanced metadata and/or others products generated from the time-tagged video, including, for example, mosaics.

The devices, servers and the like may be fitted with (i) one or more tools for importing the time-tagged video and sensor metadata in any of various common formats into a geodatabase, where it is represented in terms of GIS features and tables; (ii) map layers displaying footprints, images, and mosaics of the time-tagged video, which may be used in conjunction with one or more standard GIS map layers displaying reference imagery and other GIS data; (iii) one or more tools for generating a geo-located arrangement of the time-tagged video frames, by performing frame-to-frame motion and incorporating the frame-to-frame motion information and manually entered tiepoints in the enhanced metadata, and for rendering such frame arrangements as geo-located mosaics; (iv) one or more tools for manually entering tiepoints between the time-tagged video frames and map data, such as reference imagery, to allow manual correction of inaccurate sensor and/or enhanced metadata; and (v) one or more tools for exporting the time-tagged video frames properly geo-registers, mosaics and map images from the GIS database in standard formats.

In addition, each of the devices, servers, and the like may be formed in logic in the form of software, hardware and/or firmware. This logic may be embodied in, integrated with or otherwise combined with a computing platform, which may be concentrated on one node or distributed on more than one node.

The computing platform, in turn, may be embodied in, integrated with or otherwise combined with one or more of a general or specialty purpose computer, a personal computer, a mainframe, a minicomputer, a server-type computer, a cellular phone, a personal digital assistant, a laptop, a specially-configured handheld device, a GPS receiver, a satellite receiver and the like, and may include a central-processing unit ("CPU"), memory, supports circuits, and a bus.

The CPU may be one or more conventional microprocessors and/or microcontrollers. The support circuits facilitate operation of the CPU, and may include well-known circuitry or circuits, including, for example, input/output ("I/O") interfaces and/or circuits, cache, clock circuits, power supplies, network-interface units and the like. The network-interface unit of the support circuits may be used for exchanging (e.g., sending and/or receiving) over the aforementioned communication links information, including (and relating to), as appropriate, the intelligence information, the time-tagged video (frames), the sensor metadata, the enhanced metadata, the imagery, the broadband data, etc.

The memory may store various software and/or executable instructions that are used to operate and/or facilitate exchange of the information between the components of its respective one of the devices, servers and the like. The memory may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like that store the software and/or executable instructions, including operands, operators, dimensional values, configurations, and other data that are used to control the operation of and/or facilitate performing the functions of the respective one of the devices, servers and the like.

The bus provides for transmissions of digital information, including (and information relating to), as appropriate, the intelligence information, the time-tagged video (frames), the sensor metadata, the enhanced metadata, the imagery, the broadband data, etc., among the CPU, the memory, and support circuits and other portions of the respective one of the devices, servers and the like. The I/O interface provides an interface to control the transmissions of the digital information between components of the respective one of the devices, servers and the like.

In addition, the I/O interface provides an interface to control the transmissions of digital information between I/O devices associated with or otherwise attached to the respective one of the devices, servers and the like. The I/O devices may be embodied as any or any combination of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a user input device, including a keyboard, a keypad, a mouse and the like.

The software applications and/or executable instructions may include one or more applications. In accord with above, these applications may be operable to any of the aforementioned functions of the respective one of the devices, servers and the like. These applications may be in any of a standalone, client/server, peer-to-peer and other format. Other forms of the applications are possible as well.

The logic may perform the functions described herein, including the functions of the applications, using conventional and non-conventional processing techniques. For example, the applications may be loaded into the memory and executed by the CPU to implement the functions as discussed herein. As such, any of the functions discussed herein (including processing associated data structures) can be stored, via one or more of the I/O devices, in a computer readable medium, carrier and/or store, including any of a random access memory, read-only memory, optical storage, magnetic storage, removable storage, erasable programmable read only memory and variations thereof, content addressable memory and variations thereof, flash memory, disk drive or diskette storage, removable storage, and the like.

While the foregoing is directed to embodiments of the present invention, other and further embodiments of the invention may be devised without departing from the basic scope thereof, and the scope thereof is determined by the claims that follow.

We claim:

1. A method for distributing, to at least one remote device, broadband data associated with information garnered from at least one sensor, the method comprising:
    aligning, temporally, video and metadata from the at least one sensor;
    using the aligned metadata, spatially aligning at least a portion of the video from the at least one sensor with one or more reference images;
    forming and distributing to the at least one remote device, enhanced metadata comprising a set of video processing and display parameters for the spatially aligned video and tracking parameters for performing object tracking, to enable generating and displaying, at the at least one remote device, at least a portion of the video in an enhanced manner in accordance with said alignment;
    modifying, responsive to feedback, any of the enhanced metadata and the video so as to produce corresponding modified enhanced metadata and modified video, wherein the feedback is received from the at least one remote device; and
    transmitting to the at least one remote device any of the modified enhanced metadata and modified video, whereby the least one remote device displays any of (i) the at least a portion of the modified video in accordance with the modified enhanced metadata, and (ii) the modified enhanced metadata.

2. The method of claim 1, wherein the enhanced metadata further enables displaying, at the at least one remote device, at least a portion of the enhanced metadata.

3. The method of claim 1, wherein at least a portion of each of the video and metadata from the at least one sensor is tagged with a given time, and wherein aligning, temporally, comprises aligning the portions of the video and metadata tagged with the given time.

4. The method of claim 1, wherein the video and metadata from the at least one sensor are in a streaming format.

5. The method of claim 1, further comprising transforming the video and metadata from the at least one sensor for storage in accordance with a capability of the at least one remote device.

6. The method of claim 1, wherein any of aligning temporally, aligning spatially, forming enhanced metadata, and distributing to the at least one remote device the enhanced metadata is performed in any of real time, near real time, and/or substantially continuously with creation of the video and metadata from the at least one sensor.

7. The method of claim 1, wherein aligning temporally comprises performing any of synchronization, refining, filtering, noise reduction and interpolation of the video and metadata from the at least one sensor.

8. The method of claim 1, wherein generating and displaying at the at least one remote device at least a portion of the video in an enhanced manner further comprises performing any of stabilization and mosaicking to the at least a portion of the video.

9. The method of claim 1, wherein the enhanced metadata is formatted in accordance with a thin-file format.

10. The method of claim 1, further comprising distributing the modified video to the at least one remote device.

11. The method of claim 1, wherein the feedback comprises manual georegistration of the data from the at least one sensor with geo-information.

12. The method of claim 1, further comprising using the spatially aligned video, the metadata and the enhanced metadata to detect objects moving within an area of surveillance, wherein the at least one remote device includes a graphical user interface for displaying any of the spatially aligned video, the enhanced metadata, and the moving objects.

13. A method for using broadband data associated with intelligence information garnered from at least one sensor and for distributing the broadband data to at least one remote device, the method comprising:
  aligning, temporally, video and metadata from the at least one sensor;
  using the aligned metadata, spatially aligning at least a portion of the video from the at least one sensor with one or more reference images;
  forming and distributing to the at least one remote device, enhanced metadata comprising a set of video processing and display parameters for the spatially aligned video and tracking parameters for performing object tracking;
  distributing to the at least one remote device the enhanced metadata, to enable generating and displaying at the at least one remote device the at least a portion of the spatially aligned video in accordance with the alignment; and
  modifying, responsive to feedback, any of the enhanced metadata and the video so as to produce corresponding modified enhanced metadata and modified video, wherein the feedback is received from the at least one remote device; and
  transmitting to the at least one remote device any of the modified enhanced metadata and modified video, whereby the at least one remote device displays any of (i) the at least a portion of the modified video in accordance with the modified enhanced metadata, and (ii) the modified enhanced metadata.

14. The method of claim 13, wherein any of aligning temporally, aligning spatially, forming enhanced metadata, associating the enhanced metadata and video, and distributing to the at least one remote device the enhanced metadata is performed in any of real time, near real time, and/or substantially continuous with creation of the video and metadata from the at least one sensor.

15. A system for distributing, to at least one remote device, broadband data associated with intelligence information garnered from at least one sensor, the system comprising:
  memory for storing executable instructions; and
  logic for obtaining from the memory the executable instructions and for causing the executable instructions to:
  align, temporally, video and metadata from the at least one sensor;
  using the aligned metadata to spatially align at least a portion of the video from the at least one sensor with one or more reference images;
  form and distribute to the at least one remote device, enhanced metadata comprising a set of video processing and display parameters for the spatially aligned video and tracking parameters for performing object tracking;
  distribute to the at least one remote device the enhanced metadata, whereby after receiving the enhanced metadata, the at least one remote device generates and displays the at least a portion of the video in an enhanced manner in accordance with the alignment;
  modify, responsive to feedback, any of the enhanced metadata and the video so as to produce corresponding modified enhanced metadata and modified video, wherein the feedback is received from the at least one remote device; and
  transmit to the at least one remote device any of the modified enhanced metadata and modified video, whereby the least one remote device displays any of (i) the at least a portion of the modified video in accordance with the modified enhanced metadata, and (ii) the modified enhanced metadata.

16. The system of claim 15, wherein the enhanced metadata further enables displaying at the at least one remote device at least a portion of the enhanced metadata, and wherein after receiving the enhanced metadata, the at least one remote device displays the at least a portion of the enhanced metadata.

17. The system of claim 15, wherein the logic executes any of the executable instructions to align temporally, align spatially, form enhanced metadata, distribute to the at least one remote device the enhanced metadata in any of real time, near real time, and/or substantially continuously with creation of the video and metadata.

* * * * *